(12) United States Patent
Schwarz et al.

(10) Patent No.: US 10,412,805 B1
(45) Date of Patent: Sep. 10, 2019

(54) CONTROL METHOD AND APPARATUS FOR EXTENDING RUNTIME ON A PORTABLE LIGHTING DEVICE

(71) Applicant: Black & Decker Inc., New Britain, CT (US)

(72) Inventors: Daniel L. Schwarz, Timonium, MD (US); Michael J. Schaub, Nottingham, MD (US); Crystal G. Young, Joppa, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 15/981,130

(22) Filed: May 16, 2018

(51) Int. Cl.
| | |
|---|---|
| *H05B 33/08* | (2006.01) |
| *F21Y 115/10* | (2016.01) |
| *F21V 23/02* | (2006.01) |
| *F21L 4/00* | (2006.01) |
| *F21V 29/70* | (2015.01) |
| *B60Q 1/04* | (2006.01) |
| *B60Q 1/00* | (2006.01) |

(52) U.S. Cl.
CPC ..... *H05B 33/0851* (2013.01); *H05B 33/0815* (2013.01); *F21L 4/00* (2013.01); *F21V 23/023* (2013.01); *F21V 29/70* (2015.01); *F21Y 2115/10* (2016.08)

(58) Field of Classification Search
CPC ............ H05B 37/0272; H05B 37/0227; H05B 37/0281; H05B 33/0815; H05B 37/0218; H05B 33/0872; H05B 33/0854; H05B 37/02
USPC .......................... 315/291, 307, 152, 297, 158
See application file for complete search history.

(56) References Cited

U.S. PATENT DOCUMENTS

| | | | |
|---|---|---|---|
| 7,651,240 B2 | 1/2010 | Bayat et al. | |
| 7,745,957 B2 | 6/2010 | Bayat et al. | |
| 8,492,987 B2 | 7/2013 | Nuhfer et al. | |
| 8,492,988 B2 | 7/2013 | Nuhfer et al. | |
| 8,680,787 B2 | 3/2014 | Veskovic | |
| 8,779,690 B2 | 7/2014 | Tsai et al. | |
| 9,113,521 B2 | 8/2015 | Gredler et al. | |
| 9,474,126 B2 | 10/2016 | Hilbe et al. | |
| 9,478,108 B2 | 10/2016 | Matte et al. | |
| 9,497,817 B2 | 11/2016 | Gredler et al. | |

(Continued)

FOREIGN PATENT DOCUMENTS

| | | |
|---|---|---|
| DE | 202016101368 U1 | 12/2016 |
| DE | 102015113065 A1 | 2/2017 |

(Continued)

OTHER PUBLICATIONS

1. Phillips Work Light—Aug. 28, 2018.
2. Rechargeable LED Work Light—Nov. 14, 2017.

*Primary Examiner* — Wei (Victor) Chan
(74) *Attorney, Agent, or Firm* — Amir Rohani

(57) ABSTRACT

A lighting apparatus is provided including a lighting unit arranged to emit light; a switching device disposed between a power source and the lighting unit; and a controller configured to set a drive signal based on a target luminance level of the lighting unit and control a switching operation of the switching device via a drive signal to regulate a supply of electric power from the power source to the lighting unit. The controller monitors a voltage of the power source and periodically adjusts the drive signal based on the voltage of the power source.

13 Claims, 8 Drawing Sheets

(56) References Cited

U.S. PATENT DOCUMENTS

| | | | |
|---|---|---|---|
| 9,574,725 B2 | 2/2017 | Pellenc | |
| 9,635,726 B2 | 4/2017 | Gredler et al. | |
| 9,814,112 B2 | 11/2017 | Gredler et al. | |
| 2007/0171218 A1 | 7/2007 | Hong et al. | |
| 2011/0140621 A1* | 6/2011 | Yi | H05B 33/0854 |
| | | | 315/224 |
| 2011/0248648 A1* | 10/2011 | Liu | G09G 3/3406 |
| | | | 315/294 |
| 2013/0342131 A1* | 12/2013 | Recker | H05B 33/0842 |
| | | | 315/292 |
| 2014/0070728 A1* | 3/2014 | Pflaum | H02M 3/156 |
| | | | 315/307 |
| 2014/0253306 A1* | 9/2014 | Gillespey | B60Q 1/00 |
| | | | 340/425.5 |
| 2016/0323972 A1* | 11/2016 | Bora | H05B 33/0842 |
| 2017/0127501 A1 | 5/2017 | Isaacs et al. | |
| 2017/0188423 A1 | 6/2017 | Witkowski et al. | |

FOREIGN PATENT DOCUMENTS

| | | |
|---|---|---|
| EP | 2827684 A1 | 1/2015 |
| EP | 2820920 B1 | 6/2016 |
| EP | 3128622 A1 | 2/2017 |
| JP | 2008-033461 A | 2/2008 |
| WO | 2006086308 A2 | 8/2006 |
| WO | 2006086308 A3 | 4/2009 |
| WO | 2012098494 A2 | 7/2012 |
| WO | 2012098494 A3 | 11/2012 |
| WO | 2015173680 A1 | 11/2015 |
| WO | 2016126964 A1 | 8/2016 |
| WO | 2017210126 A1 | 12/2017 |

\* cited by examiner

CONTROL METHOD AND APPARATUS FOR EXTENDING RUNTIME ON A PORTABLE LIGHTING DEVICE

FIELD

This disclosure relates to lighting devices, and in particular to a control method and apparatus for extending runtime of a battery-operated lighting device.

BACKGROUND

Reference is made to US. 2016/0348879, contents of which are incorporated herein by reference in entirety, for an example of an area lighting device capable of being powered by a battery pack. In this lighting device, a removeable battery pack is received into a battery receptacle for powering a series of LEDs mounted on a head portion of the light. The battery pack may be, for example, a 20V Max lithium-ion sliding battery pack.

Powering LED lighting devices with a battery power source provides significant benefits in convenience and portability, but also provides limitations on run time. This is generally not a significant problem in smaller scale lighting devices such as flash lights, but as higher power lighting devices become prevalent, battery life presents a significant obstacle. What is needed is a method of conserving and prolonging battery life for such lighting devices.

SUMMARY

According to an embodiment of the invention, a lighting apparatus is provided including a lighting unit arranged to emit light; a switching device disposed between a power source and the lighting unit; and a controller configured to set a drive signal based on a target luminance level of the lighting unit and control a switching operation of the switching device via a drive signal to regulate a supply of electric power from the power source to the lighting unit. In an embodiment, the controller is configured to monitor a voltage of the power source and periodically adjust the drive signal based on the voltage of the power source.

In an embodiment, the controller is configured to set a pulse-width modulation (PWM) duty cycle associated with the drive signal based on the target luminance level of the lighting unit and modify the PWM duty cycle based on the voltage of the power source.

In an embodiment, a control interface is provided and configured to receive an input from a user indicative of a selected luminance mode and communicate the selected luminance mode to the controller, the controller setting the drive signal based on the selected luminance mode.

In an embodiment, the control interface further receives an input from the user indicative of a first mode, where the controller periodically adjusts the drive signal based on the voltage of the power source, or a second mode, where the controller does not adjust the drive signal based on the voltage of the power source.

In an embodiment, the controller is configured to scale down the drive signal when the voltage of the power source is less than a first threshold but greater than a second threshold.

In an embodiment, when the lighting apparatus is turned ON, the controller adjusts the drive signal based on the voltage of the power source.

In an embodiment, the lighting apparatus includes a main body and a head portion mounted on the main body, the main body including a battery receptacle for receiving a removable battery pack therein, the head portion including a heat sink. In an embodiment, the lighting unit includes a light Emitting Diode (LED) mounted on the heat sink.

In an embodiment, a level shifter is disposed between the power source and the controller and configured to provide the controller with a voltage signal indicative of the voltage of the power source.

According to an embodiment, a lighting apparatus is provided including a lighting unit arranged to emit light; a switching device disposed between a power source and the lighting unit; and a controller configured to set a drive signal based on a target luminance level of the lighting unit and control a switching operation of the switching device via a drive signal to regulate a supply of electric power from the power source to the lighting unit. In an embodiment, the controller is configured to adjust the drive signal periodically to reduce the supply of electric power from the power source to the lighting unit after passage of a first predetermined time until a second predetermined time is reached.

In an embodiment, the controller is configured to set a pulse-width modulation (PWM) duty cycle associated with the drive signal based on the target luminance level of the lighting unit and reduce the PWM duty cycle based on a timer that is incremented periodically between the first predetermined time and a second predetermined time.

In an embodiment, a control interface is provided and configured to receive an input from a user indicative of a selected luminance mode and communicate the selected luminance mode to the controller, the controller setting the drive signal based on the selected luminance mode.

In an embodiment, the control interface further receives an input from the user indicative of a first mode, wherein the controller periodically adjusts the drive signal based on the timer between the first predetermined time and the second predetermined time, or a second mode, wherein the controller does not adjust the drive signal based on a timer.

In an embodiment, when the lighting apparatus is turned ON, the controller resets the timer.

In an embodiment, the lighting apparatus includes a main body and a head portion mounted on the main body, the main body including a battery receptacle for receiving a removable battery pack therein, the head portion including a heat sink, wherein the lighting unit includes a chip-on-board (COB) light Emitting Diode (LED) mounted on the heat sink.

According to an embodiment, a method is provided for controlling a lighting apparatus having a lighting unit arranged to emit light via a controller and a switching device disposed between a power source and the lighting unit. In an embodiment, the method include: receiving a signal associated with a target luminance level of the lighting unit; setting a drive signal based on the target luminance level; controlling a switching operation of the switching device via the drive signal to regulate supply of electric power from the power supply to the lighting unit; monitoring a voltage of the power supply; and adjusting the drive signal periodically based on the voltage of the power source.

In an embodiment, the controlling a switching operation step includes setting a pulse-width modulation (PWM) duty cycle associated with the drive signal based on the target luminance level of the lighting unit, and modifying the PWM duty cycle based on the voltage of the power source.

In an embodiment, the method further includes receiving a luminance mode signal from a control interface of the lighting apparatus, the luminance mode signal being indicative of a selected luminance mode, and setting the drive signal based on the selected luminance mode.

In an embodiment, the adjusting step includes scaling down the drive signal when the voltage of the power source is less than a first threshold but greater than a second threshold.

BRIEF DESCRIPTION OF THE DRAWINGS

The drawings described herein are for illustration purposes only and are not intended to limit the scope of this disclosure in any way.

Corresponding reference numerals indicate corresponding parts throughout the several views of the drawings.

DETAILED DESCRIPTION

Figure 1:
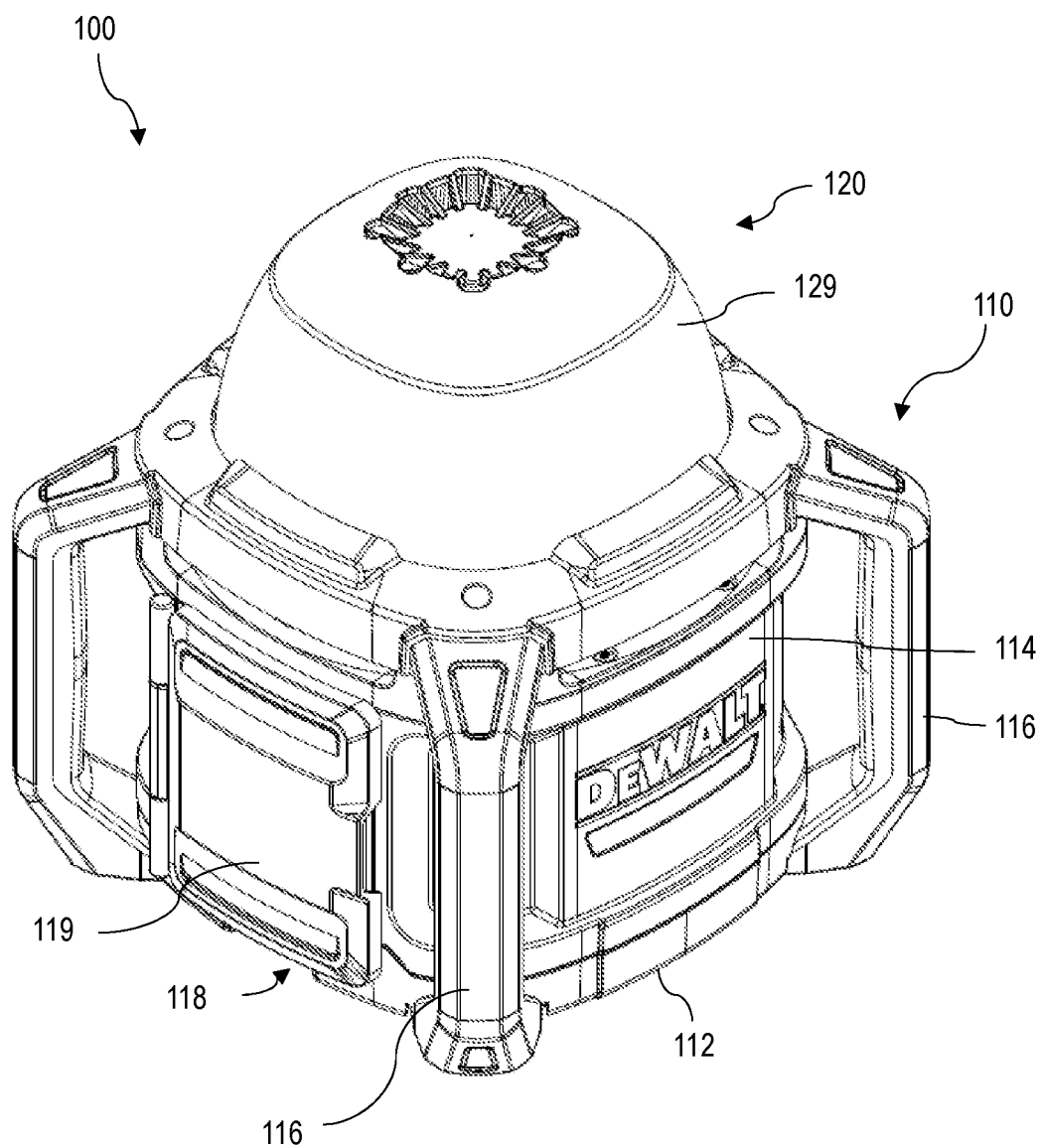
FIG. 1 depicts a perspective view of an exemplary lighting device, according to an embodiment of the invention.

The following description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

Figure 2:
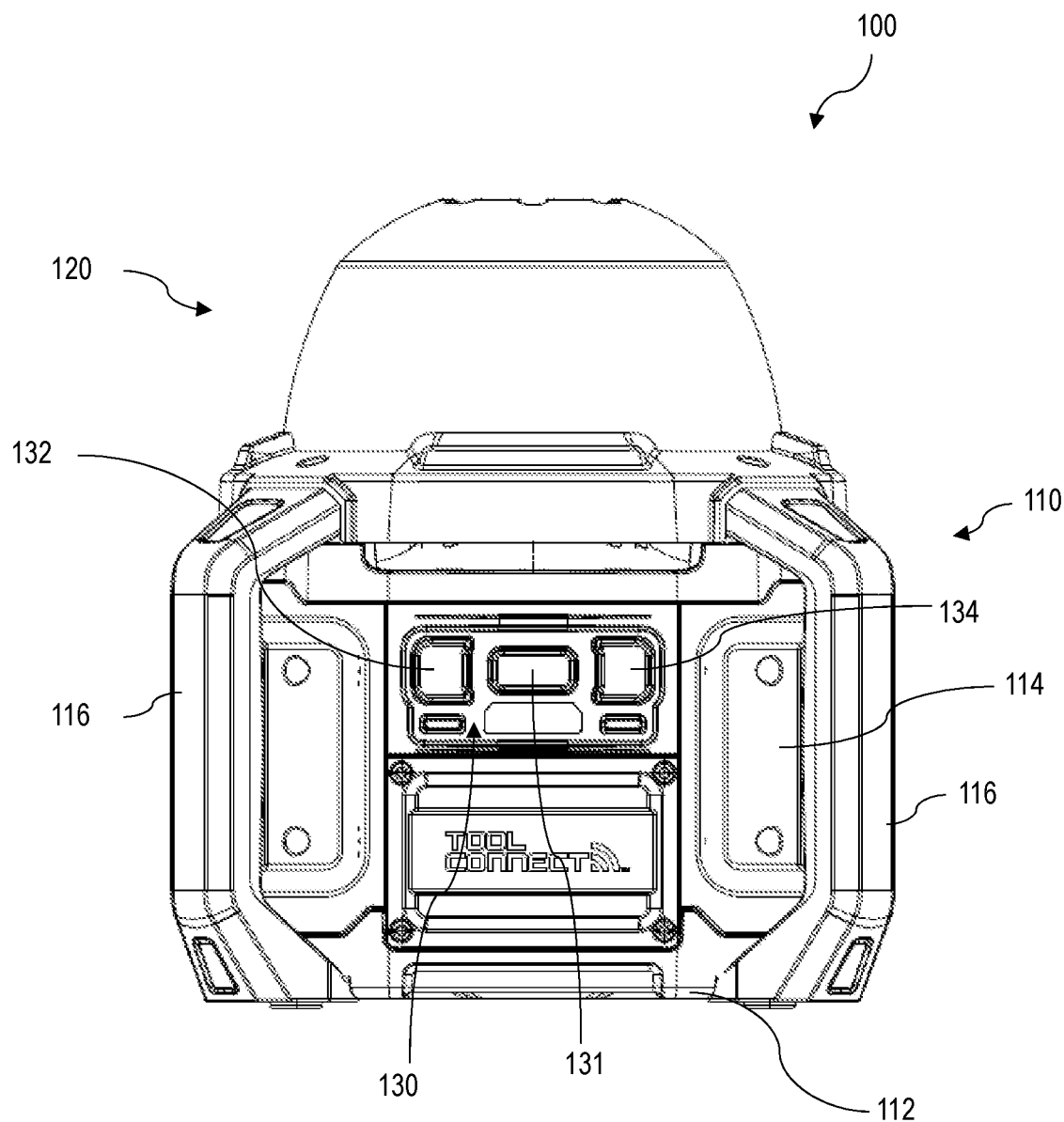
FIG. 2 depicts a side view of the lighting device, according to an embodiment of the invention.
Figure 3:
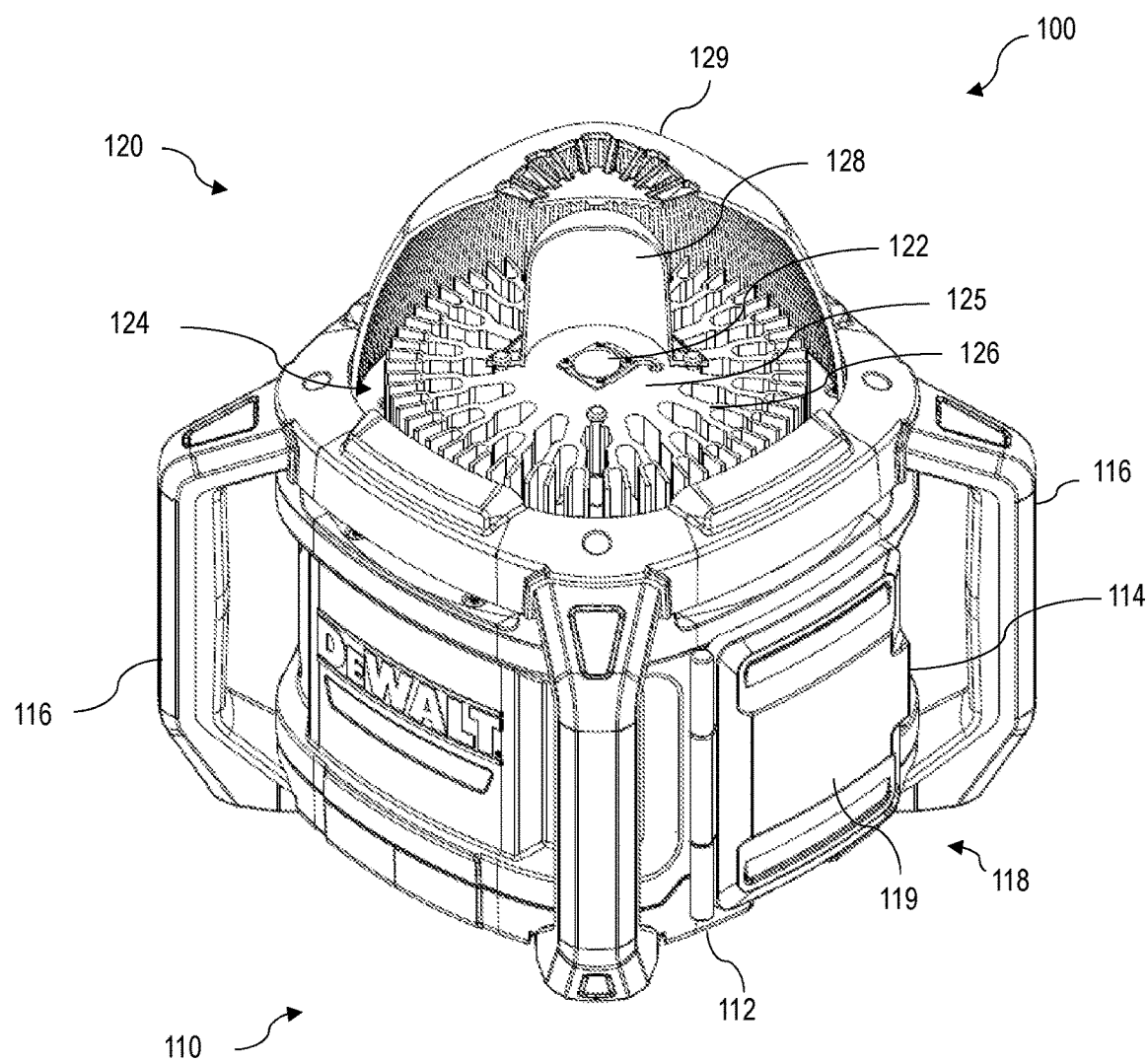
FIG. 3 depicts partially-exposed perspective view of the lighting device, according to an embodiment.

As shown in FIGS. 1-3, according to an embodiment of the invention, a portable lighting device 100 is described herein. In an embodiment, the lighting device includes a main body 110 and a head portion 120 accommodating at least one Light Emitting Diode (LED) 122.

In an embodiment, the main body 110 includes a substantially square-shaped or circular base 112 and a cubical or cylindrical body 114. Four vertical side handles 116 are disposed around the main body 110. The main body 116 includes a battery receptacle 118 having a hinged door 119 that receives a sliding battery pack (not shown) therein. The main body also includes a control interface 130 for receiving control commands from a user. The control interface includes push-buttons 131 and 132 and/or other control mechanism for turning the lighting device ON and OFF, mode selection, etc. Mode selection, in an embodiment, correlates to the amount of light output (i.e., brightness) of the LED. In an embodiment, the control interface 130 also include an 'Eco-Mode' button 134, as described later in detail.

In an embodiment, the head portion 120 includes a Chip-on-Board (COB) LED 122 mounted on a heat sink 124. The heat sink 124 may be disc-shaped or cylindrical, including a central base portion 125 and outward-projecting fins 126 projecting radially outwardly from the base portion 125. The COB LED 122 is mounted on top of the base portion 125 to allow the heat sink 124 to dissipate heat away from LED 122. A diffuser 128 having a semi-spherical head is mounted on the heat sink base portion 125 around the LED 122. A lens 129 is mounted on the main body 110 surrounding the head portion 120 components. In the illustrated example, cut-off views of the diffusor 128 and the lens 129 are shown to expose the heat sink 124 and LED 122.

Figure 4:
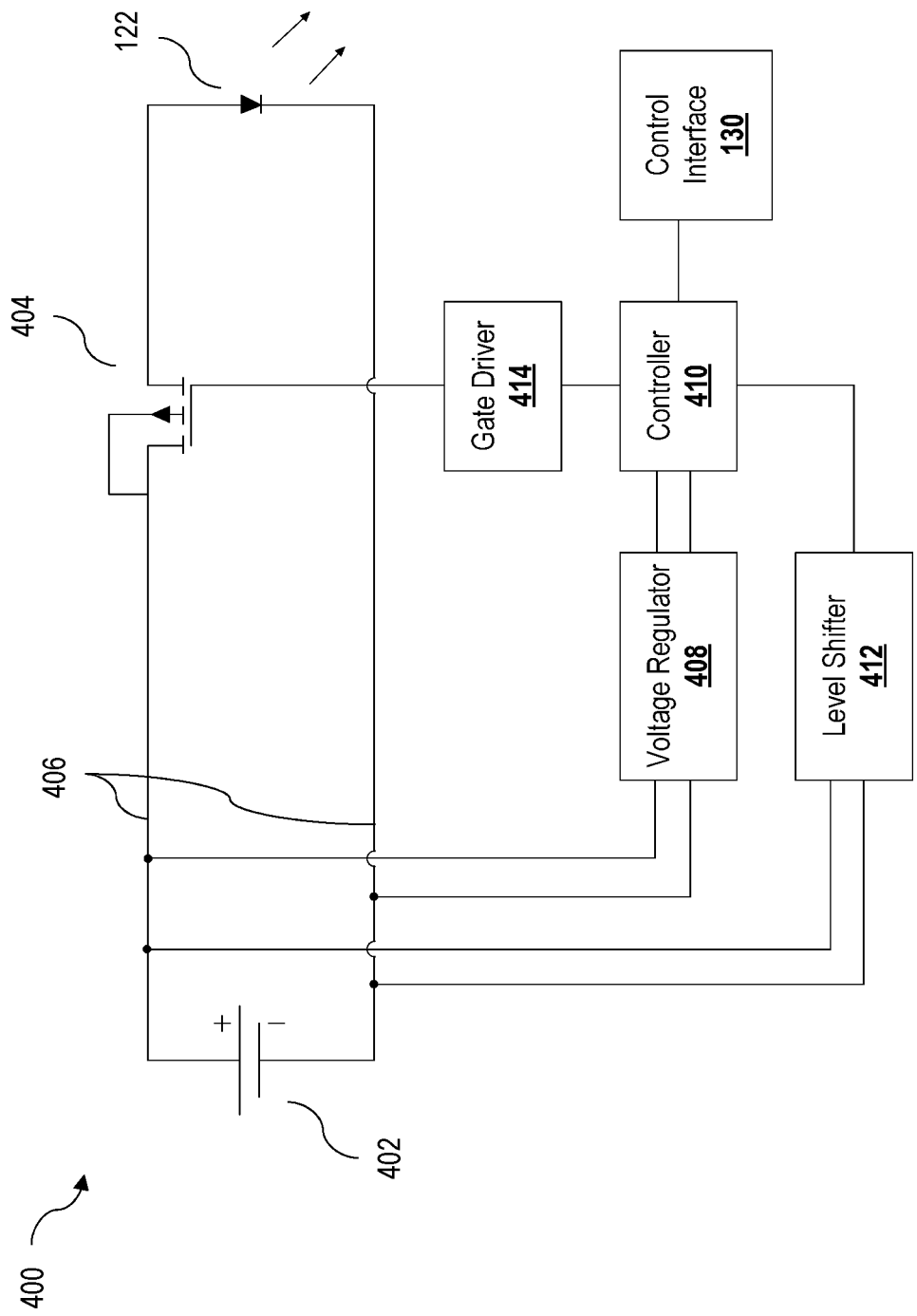
FIG. 4 depicts an exemplary block circuit diagram of the lighting device, according to an embodiment.

FIG. 4 depicts an exemplary block circuit diagram 400 of the lighting device, according to an embodiment. In an embodiment, the lighting device 100 is provided with LED 122, as described above, receiving power from a removeable battery pack 402 received through the battery receptacle 118. A solid-state switch 404 is disposed on the electrical path (i.e., us line 406) between the battery pack 402 and the LED 122. A gate of solid-state switch 404 is driven via a gate driver 414 by controller 410. Controller 410, in an example, is a programmable device such as a micro-controller, micro-processor, digital signal processor, etc. Controller 410 is powered by a voltage regulator 408 coupled to the bus line 406. The voltage regulator provides the controller 410 with a voltage (e.g., 3.2v) suitable for powering the controller 410.

In an embodiment, controller 410 controls the switching operation of the switch 404 via a pulse-width modulation (PWM) control technique to regulate the amount of electric power being supplied to the LED 122. In an embodiment, controller 410 receives a mode selection (i.e., luminance mode level selected by the user) from the control interface 130 and sets a PWM duty cycle for the switch 404 accordingly. Table 1 below. In this table, PWM duty cycle is set to a maximum 100% in a high-luminance mode, to 66% in a medium-luminance mode, and to 33% in a low-luminance mode. In an embodiment, a PWM count is further set in proportion to the duty cycle on a 0 to 255 graduation scale, at a 0.4 KHz frequency.

TABLE 1

| Luminance Mode | PWM Duty | PWM Count |
| --- | --- | --- |
| High | 100% | 255 |
| Medium | 66% | 170 |
| Low | 33% | 85 |

In an embodiment, a level shifter 412 is also coupled to the bus line 406 to provide a voltage sense signal to the controller 410 corresponding to the voltage of the bus line 406. As described below, in an embodiment, the controller 410 may use the voltage sense signal to determine the voltage level of the battery pack 402.

Figure 5:
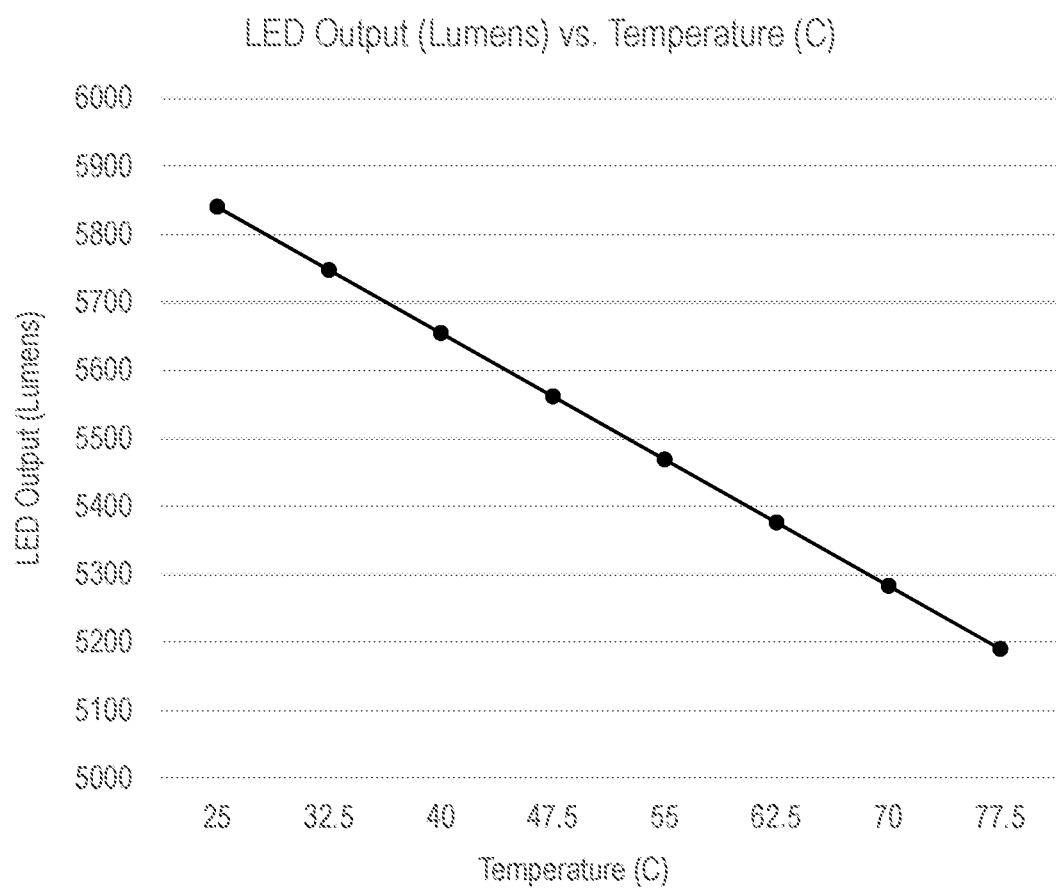
FIG. 5 depicts an exemplary graph representing a temperature v. LED output diagram, according to an embodiment.

FIG. 5 is a diagram illustrating the correlation between temperature and LED output, according to an embodiment. As seen herein, the efficiency of LEDs, defined by the ratios of electrical power (watts) input/output of the LED, improves as the operating temperature of the LED is lowered. The heat sink plays a key role in maintaining the LED temperature. A reduction in drive current can also result in not only a reduction in optical power output of the LED, but also a reduction in operating temperature if the LED is not under active temperature control. As a result, for any given reduction in drive power, the reduction in power output is less than it would be if the LED temperature were held constant. For example, a 20% reduction in drive power may result in an approximately 15% reduction in optical power output.

In an embodiment, this effect is utilized to reduce the drive current for the purpose of preserving battery power, while partially compensating for the reduction in power output with increased efficiency.

According to an embodiment, 'Eco-mode' button 134 is provided to provide the user the ability to operate the light in a way to preserve and prolong battery life. When this button is activated, the controller 410 adjusts the PWM duty cycle (or PWM counts) as described below in a way to lower luminance output of the LED 122 while preserving battery power in an efficient manner.

Figure 6:
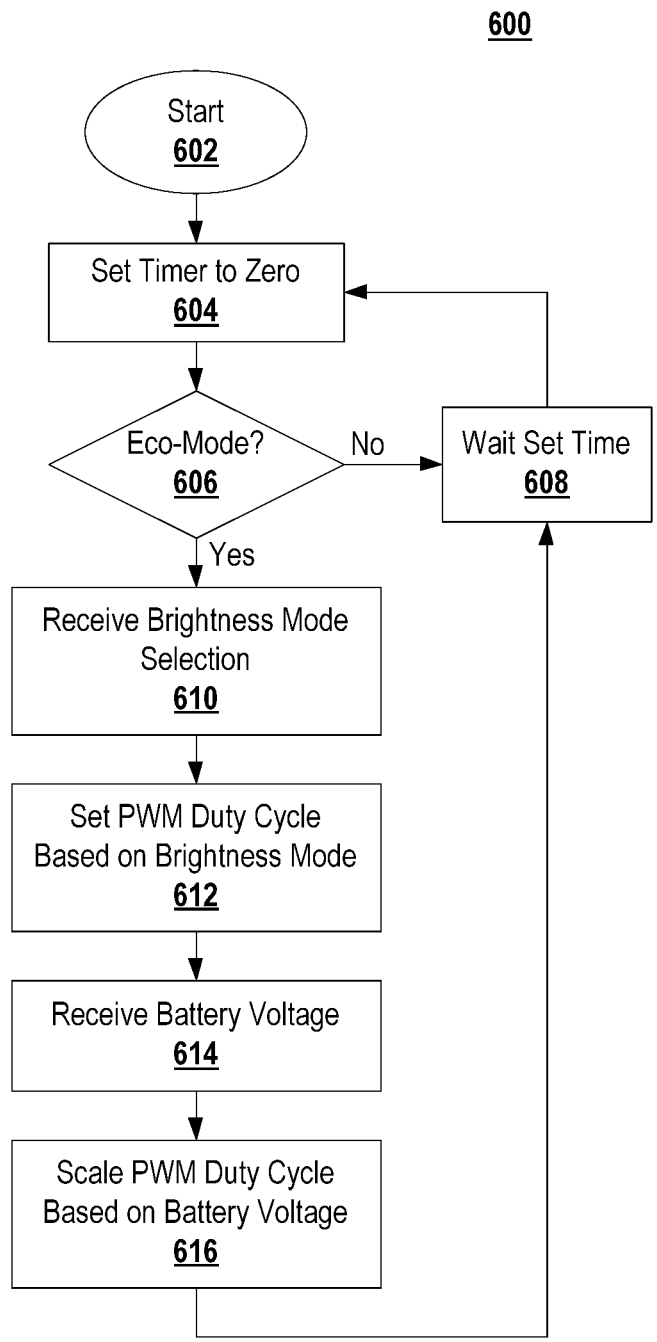
FIG. 6 is an exemplary flow diagram for controlling power of the lighting device, according to an embodiment.

FIG. 6 is an exemplary flow process 600 diagram for controlling power of the lighting device executed by the controller 410, according to an embodiment. In this embodiment, in 'Eco-mode,' the controller 410 reduces the level of brightness of the LED 122 in accordance with a specified scaler that is based on the prevailing state of charge of the battery pack 402.

In an embodiment, in executing flow process 600, which starts at step 602, the controller 410 begins by setting resetting a timer to zero at step 604. The controller 410 then determines, in step 606, whether to enter 'Eco-mode' based on input from the 'Eco-mode' button 134 of the control interface 130. If not, in step 608, the controller 410 waits for a predetermined amount of time repeats steps 604 and 606 again. Otherwise, in eco-mode, the control proceeds to steps 610-616.

In step 610, controller 410 receives a brightness mode selection, as selected by the user, from the control interface 130. In step 612, controller 410 sets the PWM duty cycle (and/or PWM counts) based on brightness mode, as shown in the example provide in Table 1 above. In step 614, controller 410 also determines battery pack 402 voltage. In an embodiment, the controller 410 does this based on the voltage sense signal from the level shifter 412. Subsequently, in step 616, controller 410 scales the PWM duty cycle (and/or PWM counts) based on the battery voltage. Process 600 then returns to step 608, where the controller 410 waits for a predetermined amount of time (e.g., 1 second) before it tests the state of charge of the battery again and repeat this process.

Table 2 depicts an example of the scaling technique utilized by the controller 410 in step 616. In this example, PWM count is scaled based on a State of Charge (SOC) Scalar value.

TABLE 2

| Luminance Mode | PWM Duty | PWM Count |
|---|---|---|
| High | 100% | 255 * SOC Scalar |
| Medium | 66% | 170 * SOC Scalar |
| Low | 33% | 85 * SOC Scalar |

Table 3 is an exemplary table utilized by the controller 410 to determine the SOC Scalar relative to the battery pack SOC.

TABLE 3

| Pack V | SOC Scalar |
|---|---|
| 19.85-20.8 | 1.000 |
| 19.8 | 0.983 |
| 19.7 | 0.950 |
| 19.6 | 0.917 |
| 19.5 | 0.883 |
| 19.4 | 0.850 |
| 19.3 | 0.817 |
| 19.2 | 0.783 |
| 19.1 | 0.750 |
| 19 | 0.717 |
| 18.9 | 0.683 |
| 15-18.8 V | 0.650 |

In an embodiment, when SOC Scalar is applied to scale the PWM counts (or PWM duty cycle), PWM is naturally decremented over the course of the battery discharge cycle. In this mode, turning the light device 100 OFF and back ON causes the controller 410 to pick up where it left off, i.e., at a PWM level corresponding to the state of charge of the battery pack 402.

Figure 7:
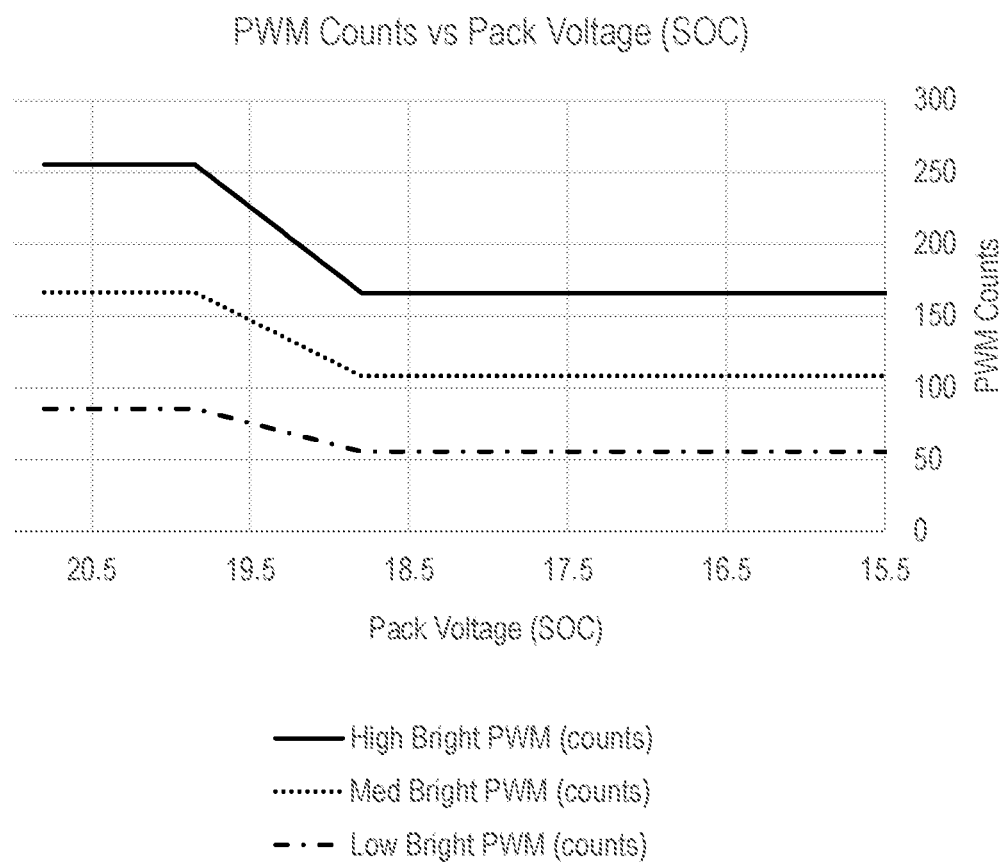
FIG. 7 depicts an exemplary graph representing a PWM counts v. battery pack voltage diagram, according to an embodiment.

FIG. 7 depicts a graphical representation of PWM counts v. battery pack voltage (SOC) chart in the high luminance, medium luminance, and low luminance modes of operation in 'Eco-mode,' as described above, according to an embodiment.

Figure 8:
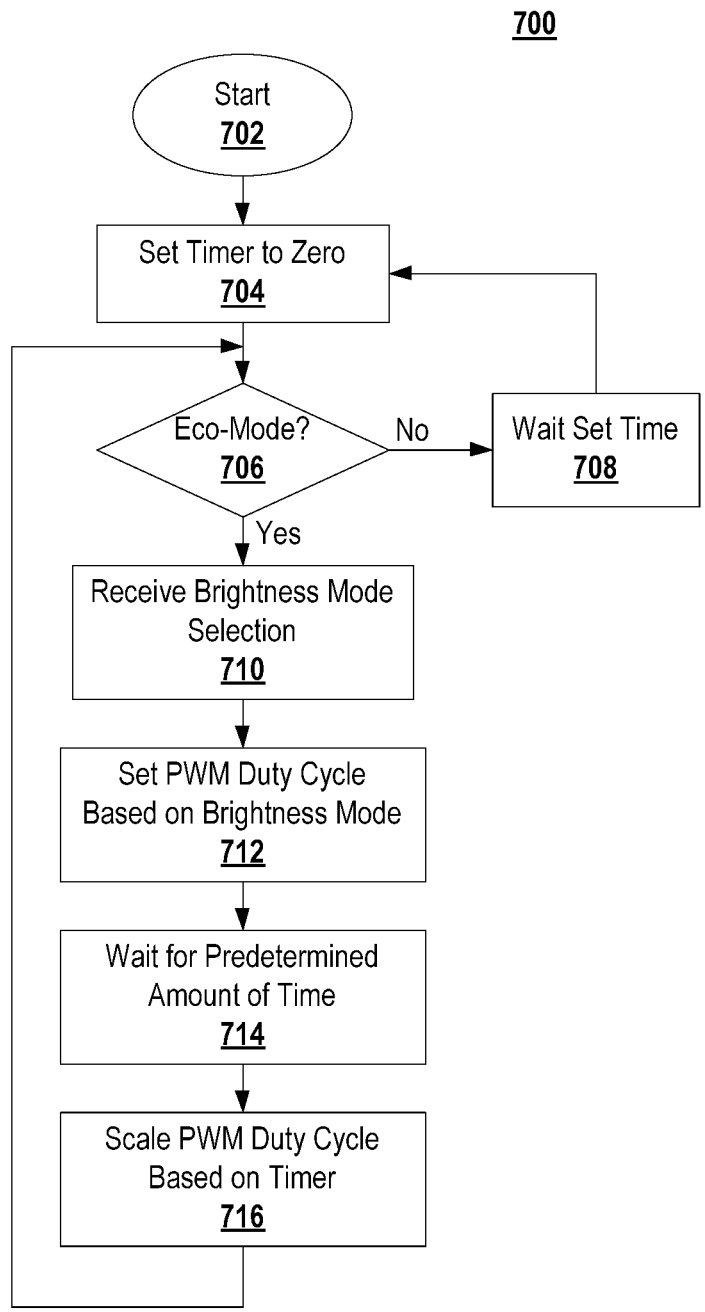
FIG. 8 is an exemplary flow diagram for controlling power of the lighting device, according to an alternative embodiment.

FIG. 8 is an exemplary flow diagram for controlling power of the lighting device executed by the controller, according to an alternative embodiment. In this embodiment, in 'Eco-mode,' the controller 410 reduces the level of brightness of the LED 122 in accordance with a specified scaler that is based on the run time of the LED 122 using battery pack 402.

In an embodiment, in executing flow process 700, which starts at step 702, the controller 410 begins by setting resetting a timer to zero at step 704. The controller 410 then determines, in step 706, whether to enter 'Eco-mode' based on input from the 'Eco-mode' button 134 of the control interface 130. If not, in step 708, the controller 410 waits for a predetermined amount of time repeats steps 704 and 706 again. Otherwise, in eco-mode, the control proceeds to steps 710-716.

In step 710, controller 410 receives a brightness mode selection, as selected by the user, from the control interface 130. In step 712, controller 410 sets the PWM duty cycle (and/or PWM counts) based on brightness mode, as shown in the example provide in Table 1 above. In step 714, controller 410 waits for a predetermined amount of time (e.g., 30 seconds). Subsequently, in step 716, controller 410 scales the PWM duty cycle (and/or PWM counts) based on the timer. Process 700 then returns to step 706, where it repeats steps 710-716 again as long as the light device 100 is being operated in 'Eco-mode', periodically decrementing the PWM count (or PWM duty cycle).

Table 4 is an exemplary table utilized by the controller 410 to determine a Eco Mode Scalar relative to the lighting device 100 run time.

TABLE 4

| Elapsed Time (s) | ECO Mode Scalar |
|---|---|
| 0-180 | 1 |
| 240 | 0.98 |
| 300 | 0.96 |

TABLE 4-continued

| Elapsed Time (s) | ECO Mode Scalar |
|---|---|
| 360 | 0.94 |
| 420 | 0.92 |
| 480 | 0.9 |
| 540 | 0.88 |
| 600 | 0.86 |
| 660 | 0.84 |
| 720 | 0.82 |
| 780 | 0.8 |
| 840 | 0.78 |
| 900 | 0.76 |
| 930-1140 | 0.75 |

In an embodiment, when Eco Scalar is applied to scale the PWM counts (or PWM duty cycle), PWM is naturally decremented over the course of time for the first several minutes (e.g., 15 minutes) after invocation of 'Eco-mode'. Once a scalar of 0.75 is reached, the controller 410 will continue to operate the light at the same brightness level until either the battery pack is fully discharged or the light is turned OFF. In eco-mode, turning the light device 100 OFF and back ON causes the controller 410 to reset the timer and return the PWM scalar back to 1.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A lighting apparatus comprising:
a lighting unit arranged to emit light;
a switching device disposed between a power source and the lighting unit, the power source comprising a direct-current (DC) battery; and
a controller configured to set a duty cycle of a Pulse-Width Modulated (PWM) drive signal to a set value based on a target luminance level of the lighting unit and control a switching operation of the switching device via the drive signal to regulate a supply of electric power from the power source to the lighting unit,
wherein the controller is configured to monitor a DC voltage of the power source and, as the DC voltage of the power source discharges, within a first predetermined DC voltage range of the power source below a predetermined voltage threshold, periodically adjust the drive signal to scale down the duty cycle of the PWM drive signal from the set value to a smaller value as a function of the voltage of the power source and as the DC voltage of the power source decreases, thereby reducing the luminance output of the lighting unit as the DC voltage of the power source decreases to extend a runtime of the battery, and
wherein, within a second predetermined DC voltage range of the power source above the predetermined voltage threshold, the controller does not adjust the drive signal to scale down the duty cycle of the PWM drive signal from the set value as the DC voltage of the power source decreases.

2. The lighting apparatus of claim 1, further comprising a control interface configured to receive an input from a user indicative of a selected luminance mode and communicate the selected luminance mode to the controller, the controller setting the drive signal based on the selected luminance mode.

3. The lighting apparatus of claim 2, wherein the control interface further receives an input from the user indicative of a first mode, wherein the controller periodically adjust the drive signal based on the voltage of the power source, or a second mode, wherein the controller does not adjust the drive signal based on the voltage of the power source.

4. The lighting apparatus of claim 1, wherein, when the lighting apparatus is turned ON, the controller adjusts the drive signal based on the voltage of the power source.

5. The lighting apparatus of claim 1, comprising main body and a head portion mounted on the main body, the main body including a battery receptacle for receiving a removable battery pack therein, the head portion including a heat sink,
wherein the lighting unit comprises a light Emitting Diode (LED) mounted on the heat sink.

6. The lighting apparatus of claim 1, comprising a level shifter disposed between the power source and the controller and configured to provide the controller with a voltage signal indicative of the voltage of the power source.

7. A lighting apparatus comprising:
a lighting unit arranged to emit light;
a switching device disposed between a power source and the lighting unit, the power source comprising a direct-current (DC) battery; and
a controller configured to set a duty cycle of a Pulse-Width Modulated (PWM) drive signal to a set value based on a target luminance level of the lighting unit and control a switching operation of the switching device via a drive signal to regulate a supply of electric power from the power source to the lighting unit, wherein the controller is configured to set a timer associated with the lighting unit and, after passage of a first predetermined time of the timer until a second predetermined time of the timer is reached, adjust the drive signal periodically to scale down the duty cycle of the PWM drive signal from the set value to a smaller value as a function of the timer, thereby gradually reducing the luminance output of the lighting unit as the DC voltage of the power source decreases to extend the runtime of the battery, and wherein, prior to the first predetermined time of the timer, the controller does not adjust the drive signal to scale down the duty cycle of the PWM drive signal from the set value as a function of the timer.

8. The lighting apparatus of claim 7, further comprising a control interface configured to receive an input from a user indicative of a selected luminance mode and communicate the selected luminance mode to the controller, the controller setting the drive signal based on the selected luminance mode.

9. The lighting apparatus of claim 8, wherein the control interface further receives an input from the user indicative of a first mode, wherein the controller periodically adjusts the drive signal based on the timer between the first predetermined time of the timer and the second predetermined time of the time, or a second mode, wherein the controller does not adjust the drive signal based on the timer between the first predetermined time of the timer and the second predetermined time of the time.

10. The lighting apparatus of claim 7, wherein, when the lighting apparatus is turned ON, the controller resets the timer.

11. The lighting apparatus of claim 7, comprising main body and a head portion mounted on the main body, the main body including a battery receptacle for receiving a removable battery pack therein, the head portion including a heat sink, wherein the lighting unit comprises a chip-on-board (COB) light Emitting Diode (LED) mounted on the heat sink.

12. A method of controlling a lighting apparatus having a lighting unit arranged to emit light via a controller and a switching device disposed between a power source and the lighting unit, the power source comprising a direct-current (DC) battery, the method comprising:
  receiving a signal associated with a target luminance level of the lighting unit;
  setting a duty cycle of a Pulse-Width Modulated (PWM) drive signal to a set value based on the target luminance level;
  controlling a switching operation of the switching device via the drive signal to regulate supply of electric power from the power source to the lighting unit;
  monitoring a DC voltage of the power source; and
  as the DC voltage of the power source discharges, within a first predetermined DC voltage range of the power source below a predetermined voltage threshold, adjusting the drive signal periodically to scale down the duty cycle of the PWM drive signal from the set value to a smaller value as a function of the voltage of the power source and as the DC voltage of the power source decreases, thereby reducing the luminance output of the lighting unit as the DC voltage of the power source decreases to extend a runtime of the battery,
  wherein, within a second predetermined DC voltage range of the power source above the predetermined voltage threshold, the controller does not adjust the drive signal to scale down the duty cycle of the PWM drive signal from the set value as the DC voltage of the power source decreases.

13. The method of claim 12, further comprising receiving a luminance mode signal from a control interface of the lighting apparatus, the luminance mode signal being indicative of a selected luminance mode, and setting the drive signal based on the selected luminance mode.

* * * * *